(12) United States Patent
Akselrod

(10) Patent No.: US 10,018,733 B2
(45) Date of Patent: Jul. 10, 2018

(54) PORTABLE AND WEARABLE COMPOSITE DOSIMETER

(71) Applicant: Landauer, Inc., Glenwood, IL (US)

(72) Inventor: Mark S. Akselrod, Stillwater, OK (US)

(73) Assignee: LANDAUER, INC., Glenwood, IL (US)

( * ) Notice: Subject to any disclaimer, the term of this patent is extended or adjusted under 35 U.S.C. 154(b) by 0 days.

(21) Appl. No.: 15/218,793

(22) Filed: Jul. 25, 2016

(65) Prior Publication Data

US 2017/0023680 A1 Jan. 26, 2017

Related U.S. Application Data

(60) Provisional application No. 62/196,017, filed on Jul. 23, 2015.

(51) Int. Cl.
*G01T 1/10* (2006.01)
*G01T 3/00* (2006.01)

(52) U.S. Cl.
CPC . *G01T 1/10* (2013.01); *G01T 3/00* (2013.01)

(58) Field of Classification Search
CPC .................................... G01T 1/10; G01T 3/00
See application file for complete search history.

(56) References Cited

U.S. PATENT DOCUMENTS

| | | | |
|---|---|---|---|
| 5,892,234 A | 4/1999 | McKeever et al. | |
| 5,962,857 A | 10/1999 | McKeever et al. | |
| 7,141,804 B1 | 11/2006 | Akselrod et al. | |
| 7,902,525 B2 | 3/2011 | Akselrod et al. | |
| 7,943,911 B2 | 5/2011 | Akselrod et al. | |
| 7,964,854 B2 | 6/2011 | Akselrod et al. | |
| 8,921,795 B2 | 12/2014 | Akselrod et al. | |
| 9,000,381 B2 | 4/2015 | Akselrod et al. | |
| 2011/0168772 A1* | 7/2011 | Yoder | G01T 1/105 235/375 |
| 2012/0061591 A1* | 3/2012 | Yoder | G01T 1/10 250/473.1 |

OTHER PUBLICATIONS

M. S. Akselrod, et al., "A Radiation Dosimetry Method Using Pulsed Optically Stimulated Luminescence" Radiation Protection Dosimeter, vol. 81, No. 3, 167-176 (1999).

(Continued)

*Primary Examiner* — Casey Bryant
(74) *Attorney, Agent, or Firm* — Harness, Dickey & Pierce, P.L.C.

(57) ABSTRACT

A portable and wearable radiation dosimeter has a wearable housing.
There is an optically stimulated luminescent (OSL) radiation sensing element removably mounted in the wearable housing so that the OSL radiation sensing element can be removed and read by an external OSL reader. There is also a fluorescent nuclear track detector (FNTD) radiation sensing element removably mounted in the wearable housing so that the FNTD radiation sensing element can be removed and read by an external FNTD reader. At least one on-board reader for at least one of the OSL and FNTD radiation sensing element for determining information about the radiation exposure of the sensing element while the sensor remains mounted in the housing, preferably using a different mode of reading than either OSL or FNTD.

9 Claims, 3 Drawing Sheets

(56) References Cited

OTHER PUBLICATIONS

Mittani, J.C.R., et al., "Investigation of Neutron Converters for Production of Optically Stimulated Luminescence (OSL) Neutron Dosimeters Using $Al_2O_3$:C." Nuclear Instruments Methods in Physics Research B 260, 663-671 (2007).

G. M. Akselrod, et al., "A Novel $Al_2O_3$ Fluorescent Nuclear Track Detector for Heavy Charged Particles and Neutrons" Nuclear Instruments and Methods in Physics Research B 247, 295-306 (2006).

M.S. Akselrod, et al., "Fluorescent Nuclear Track Detector Technology—a new way to do passive solid state dosimetry" Radiation Measurements 46, 1671-1679 (2011).

* cited by examiner

PORTABLE AND WEARABLE COMPOSITE DOSIMETER

CROSS-REFERENCE TO RELATED APPLICATION

This application claims the benefit and priority of U.S. Ser. No. 62/196,017, filed Jul. 23, 2015. The entire disclosure of the above application is incorporated herein by reference.

FIELD

The present disclosure relates to a portable and wearable composite dosimeter.

BACKGROUND

This section provides background information related to the present disclosure which is not necessarily prior art.

Dosimeters using optically stimulated luminescent (OSL) sensors with metal filters to continuously accumulate information on photon and neutron doses are well known and widely used. Examples of OSL based dosimeters are disclosed in these publications: M. S. Akselrod and S. W. S. McKeever, A Radiation Dosimetry Method Using Pulsed Optically Stimulated Luminescence, Radiat. Prot. Dosim., v. 81, No 3, 167-176 (1999). Mittani, J. C. R., Silva, A. A. R. d., Vanhavere, F., Akselrod, M. S., Yukihara, E. G., 2007; and Investigation of neutron converters for production of optically stimulated luminescence (OSL) neutron dosimeters using A1203:C. Nucl. Instr. Meth. Phys. Res. B 260, 663-671 (2007), and the following patents: U.S. Pat. Nos. 5,892,234, Method for Determining an Unknown Absorbed Dose of Radiation Using Optically Stimulated Luminescence; U.S. Pat. No. 5,962,857, Method for the Fast Determination of an Unknown Absorbed Dose of Radiation with High Sensitivity Using Optically Stimulated Luminescence; U.S. Pat. No. 8,921,795 on Method and Apparatus for Fast Determination of Unknown Dose; and U.S. Pat. No. 9,000,381, Method and Apparatus for Fast Determination of Unknown Dose. The disclosures of all of which are incorporated herein by reference in their entireties.

Likewise dosimeters using fluorescent nuclear track detector (FNTD) sensors to continuously accumulate information on photon and neutron doses and to measure low and high doses of neutrons and high doses of photons, are also well-known and widely accepted. Examples of FNTD based dosimeters are disclosed in these publications: G. M. Akselrod, M. S. Akselrod, E. R. Benton, and N. Yasuda, A Novel Al2O3 Fluorescent Nuclear Track Detector for Heavy Charged Particles and Neutrons, NIM B, 247 296-306 (2006); and 10. M. S. Akselrod, G. J Sykora Fluorescent Nuclear Track Detector technology—a new way to do passive solid state dosimetry, Radiat. Meas., 46 1671-1679 (2011); and the following patents: U.S. Pat. Nos. 7,141,804 Detection of Neutrons and Heavy Charged Particles; U.S. Pat. No. 7,902,525, Method of Luminescent Solid State Dosimetry Of Mixed Radiations; U.S. Pat. No. 7,943,911, Method of Luminescent Solid State Dosimetry of Mixed Radiations; and U.S. Pat. No. 7,964,854, Method Of Luminescent Solid State Dosimetry Of Mixed Radiations. The disclosures of all of which are incorporated herein by reference in their entireties.

However, OSL sensors and FNTD sensors are passive integrating dosimetry techniques, meaning that the sensors must be taken out of service and "read" with an external reader. While they provide sensitivity over a broad range, and a high degree of accuracy, these sensors typically cannot provide an immediate indication of the absorbed dose, and thus they cannot not provide an alarm capability that "active dosimeters" like semiconductor detectors or gas counters can do. However, active dosimeters typically have very limited dose and dose rate ranges, limiting their application to low doses. Moreover, active dosimeters stop acquiring data if the circuit fails or loses power, meaning that dose history can be lost. Because active sensors typically require a lot of power, the risk of shut down and loss of data can be significant.

SUMMARY

This section provides a general summary of the disclosure, and is not a comprehensive disclosure of its full scope or all of its features.

Generally, embodiments of the present invention provide a portable (preferably, but not necessarily, wearable) radiation dosimeter, that provides sensitivity over a broad range, and a high degree of accuracy, yet can provide real time information about radiation exposure. Preferred embodiments provide long service life, and preserve dose history even if the system fails or loses power.

A preferred embodiment of a portable in accordance with the principles of this invention comprises a housing, an optically stimulated luminescent (OSL) readable radiation sensing element removably mounted in the wearable housing so that the OSL readable radiation sensing element can be removed and read by an external OSL reader, and a fluorescent nuclear track detector (FNTD) readable radiation sensing element removably mounted in the wearable housing so that the FNTD readable radiation sensing element can be removed and read by an external FNTD reader. There is preferably at least one on-board reader for at least one of the OSL readable radiation sensing element and the FNTD readable radiation sensing element for determining information about the radiation exposure of the sensing element while the sensor remains mounted in the housing. A processor is provided for processing the information determined by the at least one on-board reader to determine a measure of radiation exposure. There is a display on the housing for displaying the measure of radiation exposure determined by the processor.

In the preferred embodiment FNTD readable radiation sensing element is also a radio-photo-luminescent (RPL) readable radiation sensing element, and the at least one on-board reader includes an RPL reader. The processor preferably controls the operation of the RPL reader to periodically determine radiation exposure, and calculates a measure of cumulative radiation exposure, and causes the calculated measure of cumulative radiation exposure to be displayed on the display, alternatively, or in addition, the processor calculates a measure of a rate of radiation exposure, and causes the calculated measure of rate of radiation exposure to be displayed on the display. The dosimeter preferably includes an alarm that can be triggered by the processor when a determined measure of radiation exposure exceeds a predetermined threshold. This alarm can be visible (e.g., a steady or blinking message or symbol displayed on the display, or an indicator light), audible (e.g. a beep, tone, ring, bell or other sound, including a spoken message), or tactile (e.g., a vibration), or some combination of these.

In the preferred embodiment, the FNTD radiation sensing element and RPL radiation sensing element comprises a single crystal of $Al_2O_3$:C,Mg. The on-board reader preferably comprises an LED for stimulating the RPL radiation sensing element, and a photodiode for detecting luminescence emitted by the RPL radiation sensing element resulting from its stimulation with the LED light. The LED is preferably a red LED for stimulating the RPL readable radiation sensing element.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
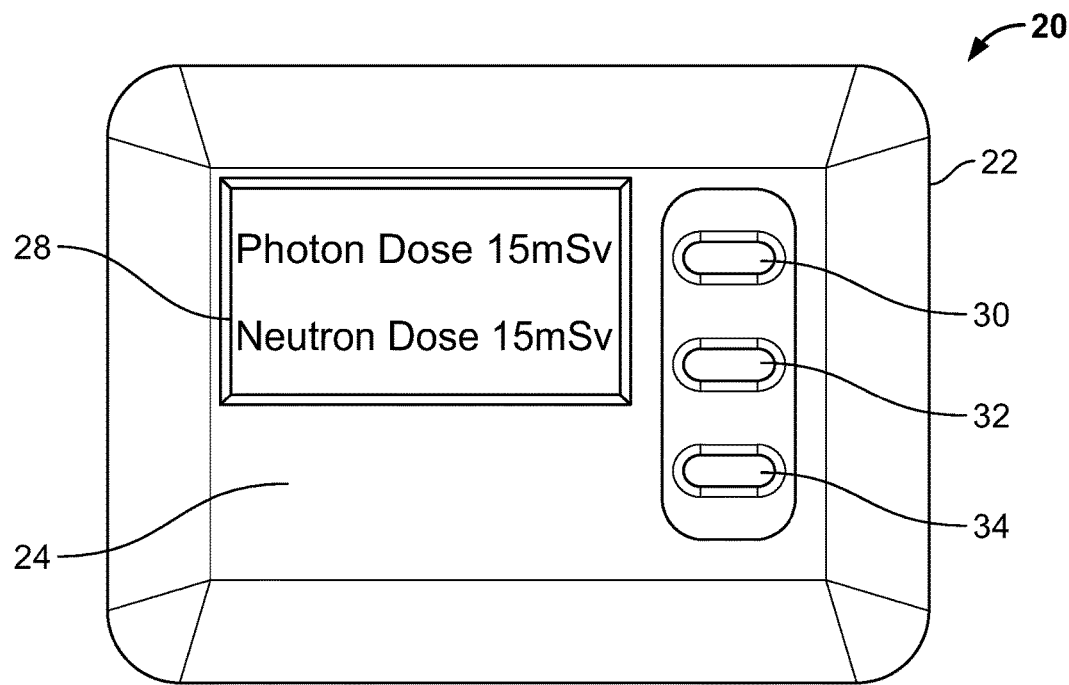
FIG. 1 is a front elevation view of a portable dosimeter constructed according to a preferred embodiment of this invention.
Figure 2:
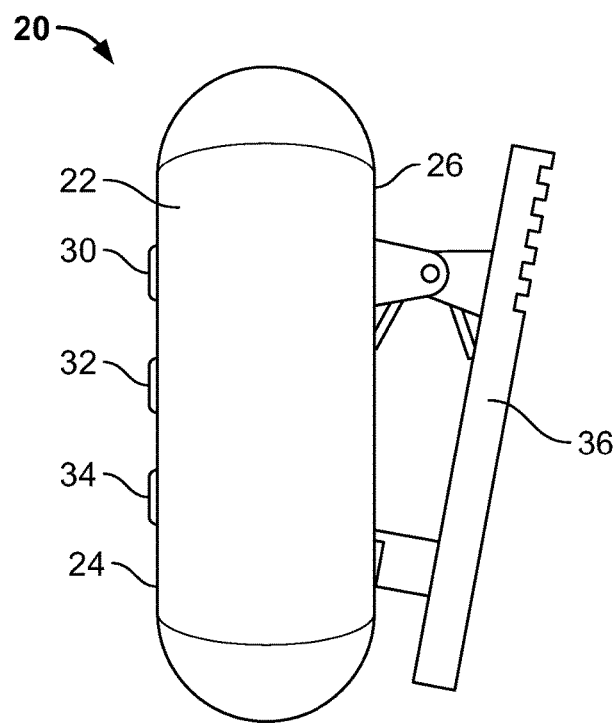
FIG. 2 is a side elevation view of the portable dosimeter of the preferred embodiment shown in FIG. 1.

A preferred embodiment of a portable dosimeter in accordance with the principles of this invention is indicated generally as 20 in FIGS. 1 and 2. The dosimeter 20 comprises a housing 22, having a front face 24 and a rear face 26. The housing 22 is preferably readily openable to allow the removal and reinstallation of sensing elements, as described below. There is a display 28 on the front face 24, and control buttons 30, 32 and 34. The display may be an LED or LCD display for displaying alphanumeric characters and/or other symbols. There is a spring-biased clip 36 on the rear face 26 of the dosimeter, so that the dosimeter can be worn by a user, for example by clipping to the user's belt or clothing.

Figure 3:
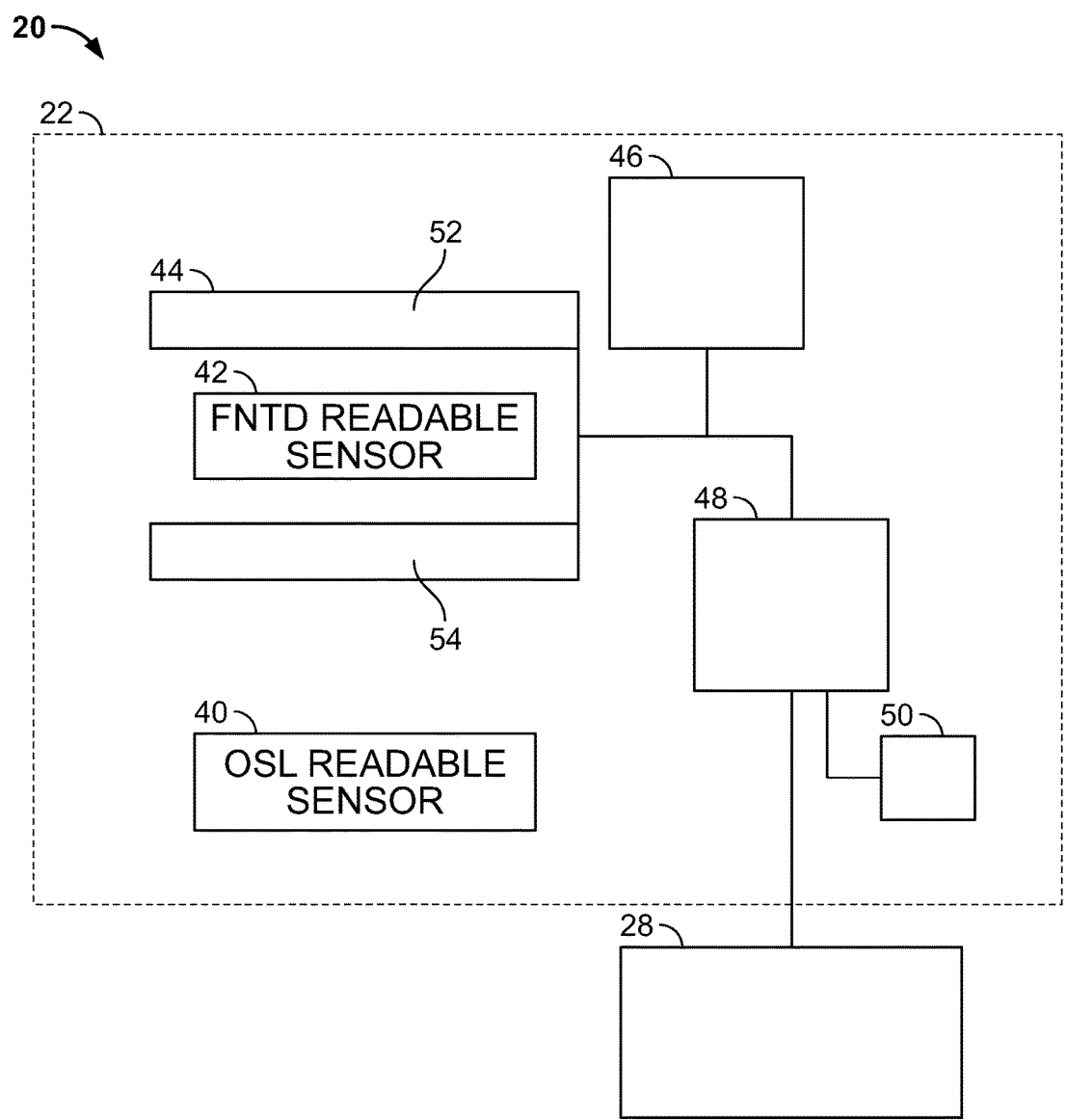
FIG. 3 is a schematic diagram of the preferred embodiment of the portable dosimeter.

As shown schematically in FIG. 3, the dosimeter 20 comprises an optically stimulated luminescent (OSL) readable radiation sensing element 40 removably mounted in the housing 22 so that the OSL readable radiation sensing element can be removed and read by an external OSL reader (not shown). This OSL readable radiation sensing element can be any sensing element, including any of those described in the publications and patents incorporated herein, such as an $Al_2O_3$ crystal, preferably doped with carbon (C). The external reader can be any OSL reader suitable for the particular OSL radiation sensing element 40.

As also shown in FIG. 3, the dosimeter 20 comprises a fluorescent nuclear track detector (FNTD) readable radiation sensing element 42 removably mounted in the wearable housing 22 so that the FNTD readable radiation sensing element can be removed and read by an external FNTD reader (not shown). This FNTD readable radiation sensing element can be any sensing element, including any of those described in the publications and patents incorporated herein, but is preferably an $Al_2O_3$ crystal, preferably doped with C and Mg.

There is preferably an on-board reader 44 for at least one of the OSL readable radiation sensing element 40 and the FNTD readable radiation sensing element 42 for determining information about the radiation exposure of the sensing element while the sensing element remains mounted in the housing. In this preferred embodiment, the on-board reader 44 comprises an LED 52 for stimulating the RPL radiation sensing element, and a photodetector 54 for detecting luminescence emitted by the RPL radiation sensing element and resulting from the LED stimulation light and at least two optical filters to separate and discriminate stimulation and emission light and prevent the stimulation light from reaching the photodetector. The LED 52 is preferably a red LED for stimulating the RPL readable radiation sensing element and photodetector is preferably a photodiode. The on-board reader 44 as well as the other components of the dosimeter 20 can be powered by an on-board power source, such as battery 46 (FIG. 3).

A processor 48 is provided for processing the information determined by at least one on-board reader 44 to determine a measure of radiation exposure. The processor 48 preferably controls the operation of the RPL reader 44 to periodically determine radiation exposure, and calculates a measure of cumulative radiation exposure, and causes the calculated measure of cumulative radiation exposure to be displayed on the display 28. Alternatively, or in addition, the processor 48 calculates a measure of a rate of radiation exposure, and causes the calculated measure of rate of radiation exposure to be displayed on the display 28.

The dosimeter 22 preferably includes an alarm 50 that can be triggered by the processor 48 when a determined measure of radiation exposure exceeds a predetermined threshold.

Figure 5:
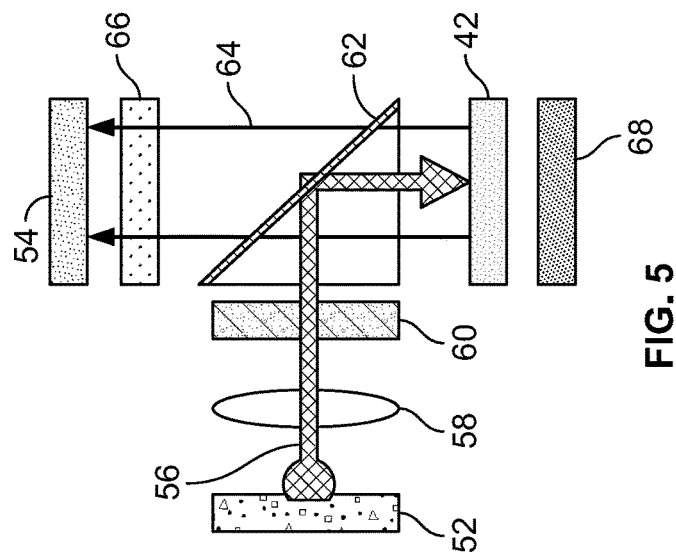
FIG. 5 is a side schematic diagram of an FNTD and RPL readable sensing element, and an RPL reader shown in FIG. 4.
Figure 4:
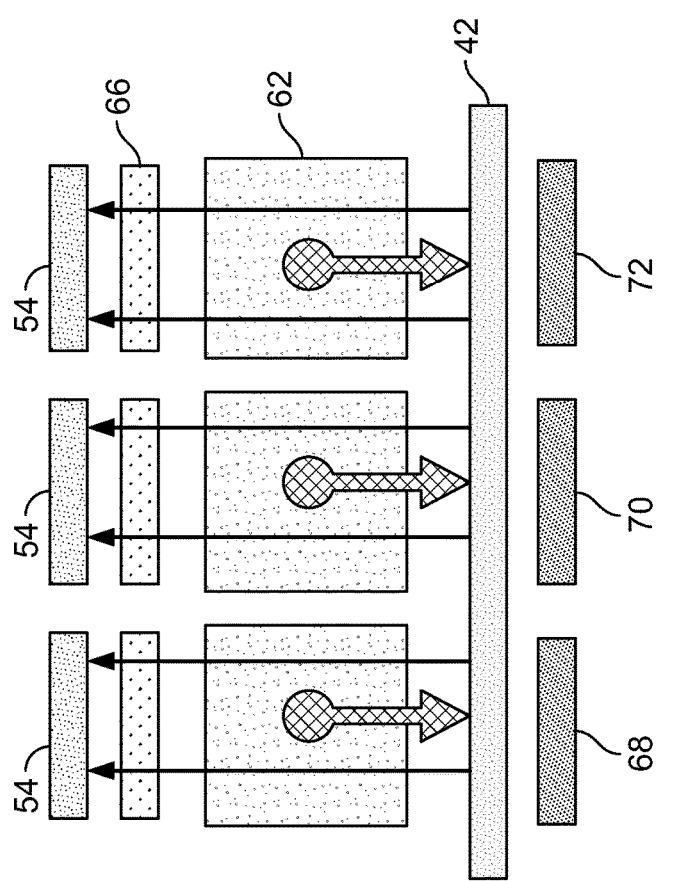
FIG. 4 is a front schematic diagram of an FNTD and RPL readable sensing element, and an RPL reader for use in the preferred embodiment of the portable dosimeter.

FIGS. 4 and 5 are schematic diagrams of a preferred embodiment of an FNTD and RPL readable sensing element, and an RPL reader adapted for use in the preferred embodiment. As shown in FIG. 5, the reader 46 comprises LEDs 52, whose light 56 is focused by lens 58 through low pass filter 60 of the portable dosimeter. The focused, filtered beam of light from the LED 52 reflects off dichroic mirror 62, on to the FNTD readable radiation sensing element 42. This stimulates emitted light, indicated at 64, which passes through a high pass filter 66 to the photodiode 54, whose output is passed to the processor 48.

As shown in FIG. 4, the FNTD/RPL readable radiation sensing element 42 has radiation converters 68, 70, and 72, which may be polyethylene, Teflon and $^6$Li-containing glass, respectively so that the sensing element 42 can differentiate among different types of radiation. FNTDs provide information about very low doses of neutrons, both thermal and fast, in the dose range from 0.1 mSv to 50 mSv using so called track counting mode of operation. At the same time FNTD can measure photon and neutron doses in the dose range between 50 mSv and 30 Sv in so called "analog mode" of operation providing a backup for the OSL based sensors.

Figure 6:
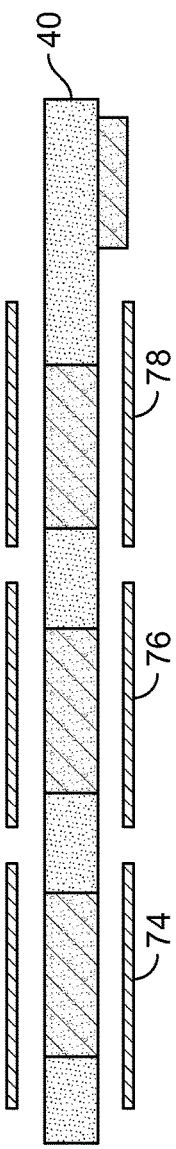
FIG. 6 is a schematic diagram of an OSL readable sensing element for use in the preferred embodiment of the portable dosimeter.

FIG. 6 shows the OSL readable radiation sensing element 40. This element 40 includes converters 74, 76, and 78, which may be polyethylene, Teflon and $^6$Li-containing glass or they may be metal filters, so that the OSL sensing element 40 can differentiate among different types of radiation. OSL sensors mounted in the extractable slide should be read by a separate reader instrument and provide reliable information about low and high photon doses in the wide range from 0.01 mSv to 30 Sv. Composite OSLN sensor, consisting of Al2O3:C sensor material combined with $^6Li_2CO_3$ convertor material, provide sensitivity to thermal and epithermal neutrons. The measure of neutron radiation is usually proportional to the difference in signal between two $Al_2O_3$:C OSL sensors—one with and another without $^6Li_2CO_3$ neutron convertor. The portions of the OSL sensor attached to polyethylene (PE) and Teflon (TF) convertors provide information about high energy neutrons by measuring the two sensor differential signal attributed to the recoil protons generated by high energy neutrons. Teflon convertor does not contain hydrogen and produces very little fast neutron induced signal. This neutron detection technique is limited only to relatively high fast neutron doses above 10 mSv and works well only in absence of strong contribution from photons radiation that otherwise obscure the neutron dose contribution. The upper limit of neutron dose detection is established to be at least 30 Sv.

Operation

In operation the dosimeter 20 can be worn by a person who is in an environment where he or she might be or will be exposed to radiation. The clip 36 allows the user to attach the dosimeter 20 to the user's clothing.

The user wears the dosimeter 20 on his or her clothing and all the time it is creating a record of the radiation to which the user is exposed. Periodically the OSL readable radiation sensing element 40 and the FNTD readable radiation sensing element 42 can be removed from the housing 22 and read using OSL and FNTD readers to accurately measure the exposure to radiation experienced by the dosimeter, and thus the user wearing the dosimeter. The OSL reader can provide reliable information from the OSL readable sensing element 40 about low and high photon doses in the wide range from 0.01 mSv to 30 Sv. When provided with the proper convertors, the OSL reader can also provide information about high energy neutrons above 10 mSv to at least about 30 Sv. The FNTD reader can provide reliable information from the FNTD readable sensing element 42 about very low doses of neutrons, both thermal and fast, in the dose range from 0.1 mSv to 50 mSv using so called track counting mode of operation. The FNTD reader can also provide photon and neutron doses in the dose range between 50 mSv and 30 Sv in the "analog mode" of operation, providing a backup for the OSL readable radiation sensing element 40.

However, during service, the on-board reader, operating under the RPL mode, operated in a fully active, or more preferably a quasi-active mode, periodically interrogating the FNTD readable sensing element 42 with a relatively low cost, low power LED as a light source, and a photodiode as a photodetector. RPL luminescent signal is typically much stronger than an OSL signal and the instrument does not require much battery power to operate. The dosimeter 20 can be configured using internal microprocessor 48 to be interrogated to detect potentially hazardous dose or dose rate of radiation within selected time intervals, reducing the power consumption that are common with active dosimeters based on semiconductor detectors or gas counters. The dose range of RPL technology using the $Al_2O_3$:C,Mg crystal of the preferred embodiment is limited to relatively high doses between 50 mSv and 30 Sv (5 cGy-30 Gy) for photons and 500 mSv to 300 Sv (5 cGy-30 Gy) of neutrons.

Generally OSL technology cannot be used on-board inside wearable dosimeters because they require highly sensitive, fragile and expensive photomultiplier tube, with high power consumption. Likewise, FNTD technologies cannot be used on-board in dosimeters because the expensive, fragile components, and their high power consumption. In contrast RPL reader and $Al_2O_3$:C,Mg single crystal sensor proposed in embodiments of this invention are rugged and consume relatively little power.

The processor of the RPL reader can process the information obtained by the on-board reader, and determine levels of exposure and/or rates of exposure. These can be displayed on the display 28.

Various alarm thresholds can be pre-set in the software or firmware of the processor, or selected by the user, and when the on-board reader detects a level of exposure and/or rate of exposure that exceeds the preset or selected alarm threshold, an alarm can be triggered. This alarm can be an audible alarm, such as a tone or a spoken message, or it can be a visual alarm such as illuminated warning light, or an indicator or message on the display 28, or it can be a tactile alarm, such as a vibration, or a combination of two or more of these alarms.

Thus the dosimeter 20 of the preferred embodiment can provide the same detailed dose information as both an OSL and FNTD dosimeters, but in addition can provide at least some real time dosage information at elevated levels of exposure, and even warnings and alarms. In the event that the dosimeter runs out of power, or the on-board reader becomes non-functional, the passive OSL and FNTD radiation sensing elements still continue to function, and can provide radiation dosage information when the appropriate external readers are available.

While the preferred embodiment relates to an FNTD sensing element that can be read with an alternate, on-board reader (an RPL reader), it is also possible that an OSL sensing element could be read with an alternate, on-board reader instead of, or in addition to the RPL reader provided for the FNTD sensing element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A portable and wearable radiation dosimeter, comprising:
    a wearable housing;
    an optically stimulated luminescent (OSL) radiation sensing element removably mounted in the wearable housing so that the (OSL) radiation sensing element can be removed and read by an external OSL reader;
    a fluorescent nuclear track detector (FNTD) radiation sensing element removably mounted in the wearable housing so that the (FNTD) radiation sensing element can be removed and read by an external FNTD reader; wherein the FNTD radiation sensing element is also a radio-photo-luminescent (RPL) radiation sensing element;
    at least one on-board reader for at least one of the radiation sensing elements for determining information about the radiation exposure of the sensing element while the sensor is mounted in the housing, the at least one on-board reader including an RPL reader;

a processor for processing the information determined by the on-board reader to determine a measure of radiation exposure; and a display on the housing for displaying the measure of radiation exposure determined by the processor.

2. The portable and wearable radiation dosimeter according to claim 1 wherein the processor controls the operation of the RPL reader to periodically determine radiation exposure, and calculates a measure of cumulative radiation exposure, and causes the calculated measure of cumulative radiation exposure to be displayed on the display.

3. The portable and wearable radiation dosimeter according to claim 1 wherein the processor controls the operation of the RPL reader to periodically determine radiation exposure, and calculates a measure of a rate of radiation exposure, and causes the calculated measure of rate of radiation exposure to be displayed on the display.

4. The portable and wearable radiation dosimeter according to claim 1 further comprising an alarm, triggered by the processor when a determined measure of radiation exposure exceeds a predetermined threshold.

5. The portable and wearable radiation dosimeter according to claim 1 wherein the on-board reader comprises an LED for stimulating the RPL radiation sensing element, and a photodiode for detecting luminescence in the RPL radiation sensing element resulting from the stimulation.

6. The portable and wearable radiation dosimeter according to claim 5 wherein the on-board reader comprises a red LED for stimulating the RPL radiation sensing element, and a photodiode for detecting luminescence in the RPL radiation sensing element resulting from the stimulation.

7. The portable and wearable radiation dosimeter according to claim 6 wherein the FNTD radiation sensing element and RPL radiation sensing element comprises a single crystal of $Al_2O_3$:C, Mg.

8. The portable and wearable radiation dosimeter according to claim 1 wherein at least one on-board reader includes an OSL reader.

9. The portable and wearable radiation dosimeter according to claim 8 wherein the OSL radiation sensing element comprises of $Al_2O_3$:C OSL material.

* * * * *